United States Patent
Erdmann et al.

(10) Patent No.: US 9,690,508 B1
(45) Date of Patent: Jun. 27, 2017

(54) PDSE PHYSICAL DUMP ANONYMIZER

(71) Applicant: International Business Machines Corporation, Armonk, NY (US)

(72) Inventors: Derek L. Erdmann, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/277,126

(22) Filed: Sep. 27, 2016

(51) Int. Cl.
G06F 11/00 (2006.01)
G06F 3/06 (2006.01)
G06F 11/07 (2006.01)

(52) U.S. Cl.
CPC ............ *G06F 3/0619* (2013.01); *G06F 3/065* (2013.01); *G06F 3/067* (2013.01); *G06F 11/0778* (2013.01)

(58) Field of Classification Search
CPC ............ G06F 11/0775; G06F 11/0787; G06F 11/0793; G06F 11/1048; G06F 11/079; G06F 17/30371; G06F 17/30864; G06F 17/30303; G06F 17/30194; G06F 17/30212
See application file for complete search history.

(56) References Cited

U.S. PATENT DOCUMENTS

| | | | | |
|---|---|---|---|---|
| 7,913,114 | B2 * | 3/2011 | Leppard | G06F 11/2094 714/15 |
| 8,151,143 | B2 | 4/2012 | Li et al. | |
| 8,583,960 | B2 * | 11/2013 | Settsu | G06F 11/0778 714/11 |
| 9,086,811 | B2 | 7/2015 | Dudgeon et al. | |
| 2012/0005528 | A1 * | 1/2012 | Belisle | G06F 11/1435 714/15 |
| 2013/0159258 | A1 * | 6/2013 | Belisle | G06F 11/1435 707/654 |
| 2013/0191343 | A1 * | 7/2013 | Reed | G06F 11/1474 707/647 |

* cited by examiner

*Primary Examiner* — Nadeem Iqbal
(74) *Attorney, Agent, or Firm* — Nelson and Nelson; Daniel P. Nelson; Alexis V. Nelson (57) ABSTRACT

A method for anonymizing a data set dump includes detecting an error in an original data set and generating a copy of the original data set. Like the original data set, the copy contains an index and a plurality of members. The method reads the index to locate members within the copy that are reachable by the index. The method then converts the copy to a scrubbed copy by overwriting customer data within the members, while retaining the index, structure of the members, and quantity of data within the data set. In certain embodiments, the method further locates lost members within the copy that are not referenced by the index, and overwrites customer data within the lost members. The scrubbed copy may then be transmitted to a technician for examination since all potentially sensitive/confidential data has been removed. A corresponding system and computer program product are also disclosed.

20 Claims, 8 Drawing Sheets

PDSE PHYSICAL DUMP ANONYMIZER

BACKGROUND

Field of the Invention

This invention relates to systems and methods for diagnosing and addressing data corruption in PDSE and other data sets.

Background of the Invention

In the z/OS operating system, PDSE (partitioned data set extended) data sets are used to simply and efficiently organize related groups of sequential files, also referred to as "members." A PDSE data set consists of a directory and zero or more members. The directory contains an index which provides a fast search for member names. When diagnosing PDSE corruption issues, the only way to conclusively determine the source of the corruption is to examine a physical dump (track copy) of the data set at or near the time the corruption is detected.

When a corruption-related error is detected, the physical dump of the data set is ideally taken automatically. However, this raises issues of dumping the data set while it is open as well as sensitivity/confidentiality for the contents of the data set. That is, taking a physical dump of the data set creates a copy of the contents of the data set which creates additional sensitivity/confidentiality concerns if the copy is distributed or accessed in an undesired manner or by unauthorized individuals. For these reasons, owners of the data typically manually take a physical dump of the data set, usually well after the initial error. After the physical dump is taken, the owner may be unable to send the diagnostic data to a technician or other external entity due to the sensitivity/confidentiality of the data in the data set. In such cases, the owner of the data may have to deal with the corruption issues internally, a task which the owner may or may not be equipped and/or trained to handle. Similar sensitivity/confidentiality issues may arise with data sets other than PDSE data sets.

In view of the foregoing, what are needed are systems and methods to more effectively diagnose and address data corruption in PDSE and other data sets. Ideally, such systems and methods will protect sensitive/confidential data and enable technicians and other external entities to diagnose and address the corruption.

SUMMARY

The invention has been developed in response to the present state of the art and, in particular, in response to the problems and needs in the art that have not yet been fully solved by currently available systems and methods. Accordingly, the invention has been developed to provide systems and methods to anonymize a dump (i.e., copy) of a data set. The features and advantages of the invention will become more fully apparent from the following description and appended claims, or may be learned by practice of the invention as set forth hereinafter.

Consistent with the foregoing, a method for anonymizing a data set dump is disclosed herein. In one embodiment, such a method includes detecting an error in an original data set. In response, the method generates a copy of the original data set. Like the original data set, the copy contains an index and a plurality of members. The method reads the index to locate members within the copy that are reachable by the index. The method then converts the copy to a scrubbed copy by overwriting customer data within the members, while retaining the index, structure of the members, and quantity of data within the data set. In certain embodiments, the method further locates lost members within the copy that are not referenced by the index, and overwrites customer data within the lost members. The scrubbed copy may then be transmitted to a technician for examination since all potentially sensitive/confidential data has been removed.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
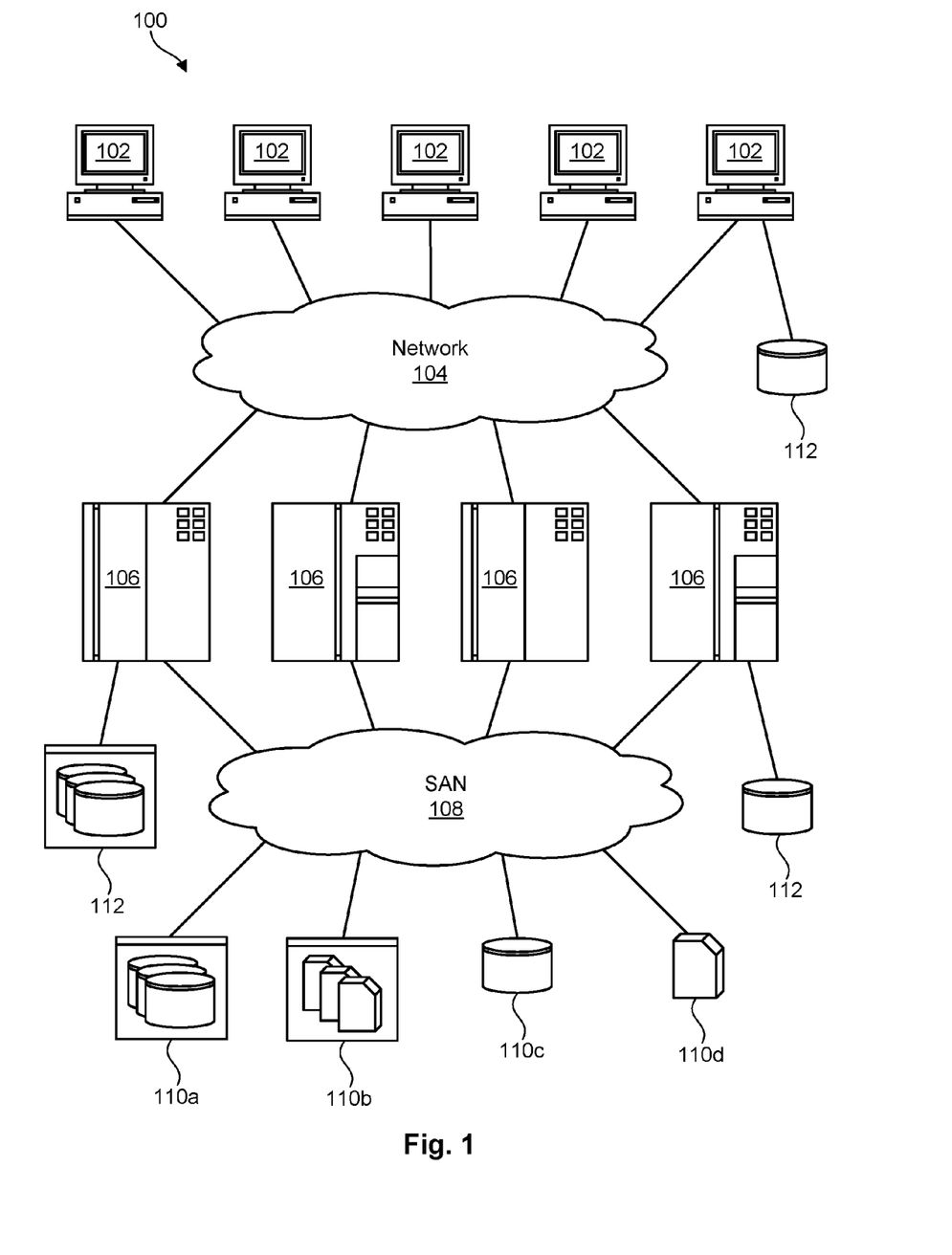
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where various embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
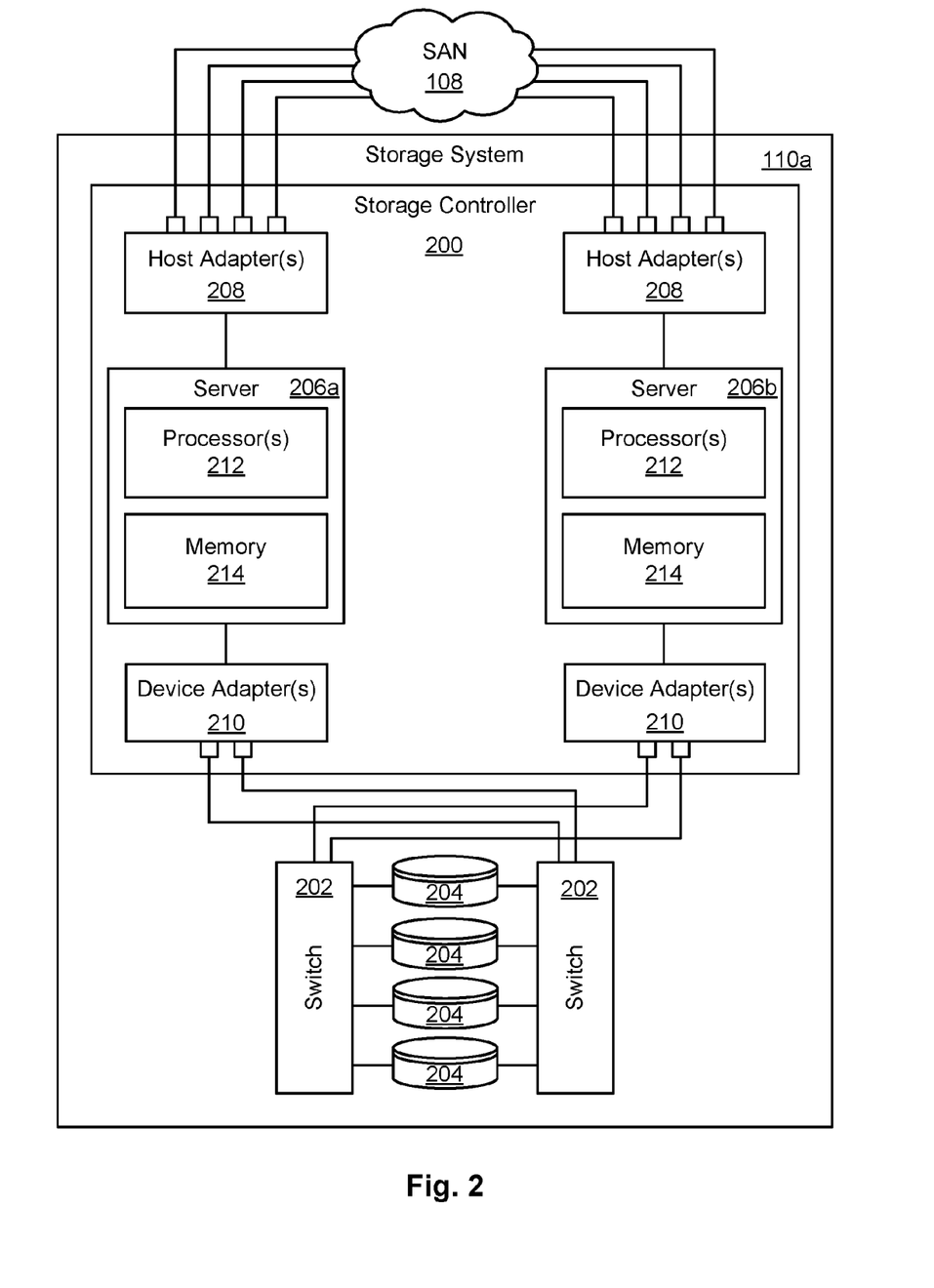
FIG. 2 is a high-level block diagram showing one example of a storage system in which a system and method in accordance with the invention may be implemented.

Referring to FIG. 2, one embodiment of a storage system 110a containing an array of storage drives 204 (e.g., hard-disk drives 204 and/or solid-state drives 204) is illustrated. The internal components of the storage system 110a are shown since various types of data sets may be stored on such a storage system 110a, although embodiments of the invention may also be applicable to other storage systems or groups of storage systems. As shown, the storage system 110a includes a storage controller 200, one or more switches 202, and one or more storage drives 204 such as hard disk drives 204 and/or solid-state drives 204 (such as flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the apparatus and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
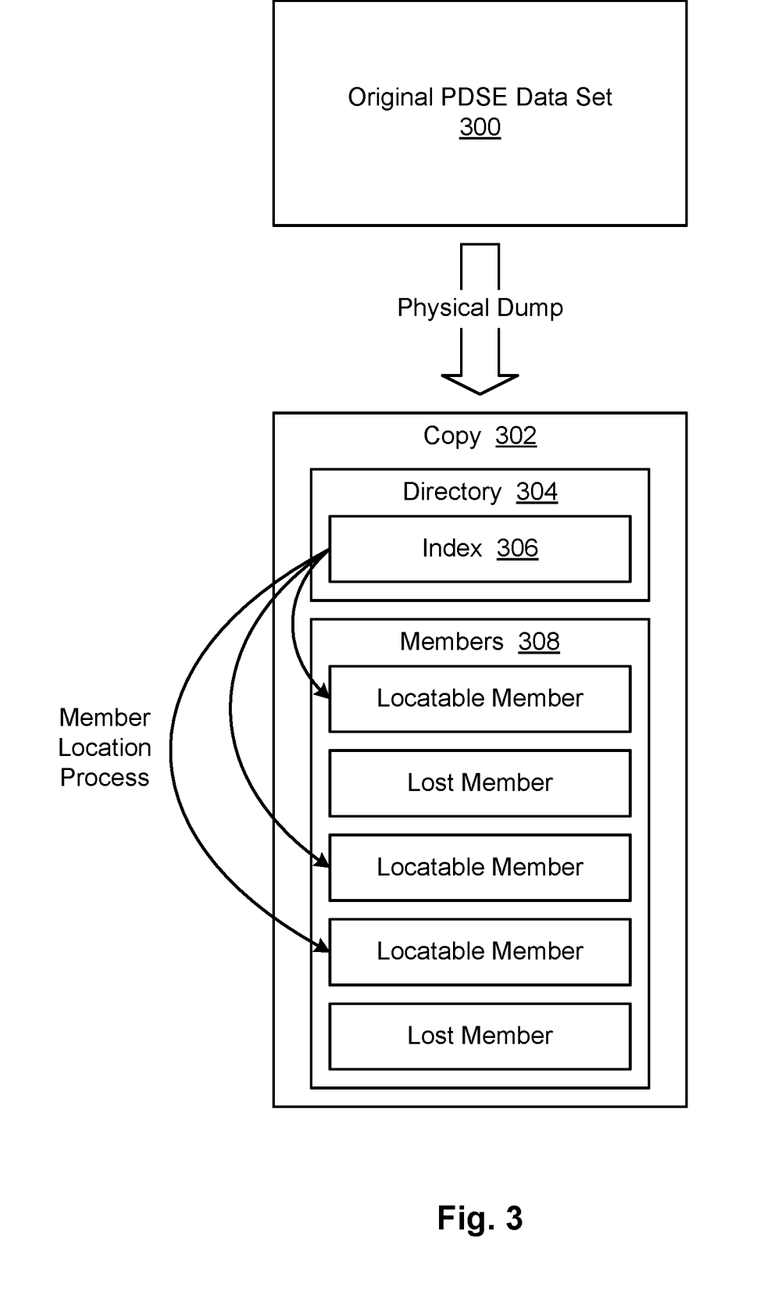
FIG. 3 is a high-level block diagram showing copying of an original data set, and reading an index of the data set to locate members within the copy that are reachable by the index.

Referring to FIG. 3, as previously mentioned, in the z/OS operating system, PDSE (partitioned data set extended) data sets 300 are used to simply and efficiently organize related groups of sequential files, also referred to as "members." A PDSE data set 300 consists of a directory and zero or more members. The directory contains an index which provides a fast search for member names. As shown in FIG. 3, when diagnosing PDSE corruption issues, the only way to conclusively determine the source of the corruption is to examine a physical dump (track copy) of the data set 300 at or near the time the corruption is detected. This process reads the PDSE data set 300 from the storage media (e.g., hard disk drives 204, solid state drives 204, etc.) as a sequential collection of tracks without regard to the internal structure of the data set 300, thereby creating an exact copy 302 of the PDSE data set 300. This has the effect of preserving any structural or index corruption in the original PDSE data set 300 for later diagnosis.

When a corruption-related error is detected, the physical dump 302 of the PDSE data set 300 is ideally taken automatically. However, this raises issues of dumping the PDSE data set 300 while it is open as well as sensitivity/confidentiality for the contents of the data set 300. That is, taking a physical dump of the data set 300 creates a copy 302 of the contents of the data set 300 which creates additional sensitivity/confidentiality concerns if the copy 302 is distributed or accessed in an undesired manner or by unauthorized individuals. For these reasons, owners of the data must typically manually take a physical dump of the data set 300, usually well after the initial error. After the physical dump is taken, the owner may be unable to send the diagnostic data to a technician or other external entity due to the sensitivity/confidentiality issues discussed above. In such cases, the owner of the data may have to deal with the corruption issues internally, a task which the owner may or may not be equipped and/or trained to handle. Similar sensitivity/confidentiality issues may arise with data sets other than PDSE data sets 300.

FIGS. 3 through 6 provide a general overview of one embodiment of a method to effectively diagnose and address data corruption in PDSE and other data sets. This method protects sensitive/confidential data and enables technicians and other external entities to diagnose and address the corruption. As shown in FIG. 3, once a physical dump 302 is taken of an original PDSE data set 300, the method reads the index 306 of the copy 302 to locate any members 308 of the PDSE data set 300 that are reachable by the index 306. Because the physical dump of the PDSE data set 300 was initiated by a corruption-related error, the index 306 may be all or partially corrupt and therefore unable to reach certain members 308 of the PDSE data set 300. These members 308 will hereinafter be referred to as "lost members." The member location process may be performed without regard to index defects, meaning that even if corruption is encountered in the index 306, the process will continue to locate all members 308 that are reachable by the index 306.

Figure 4:
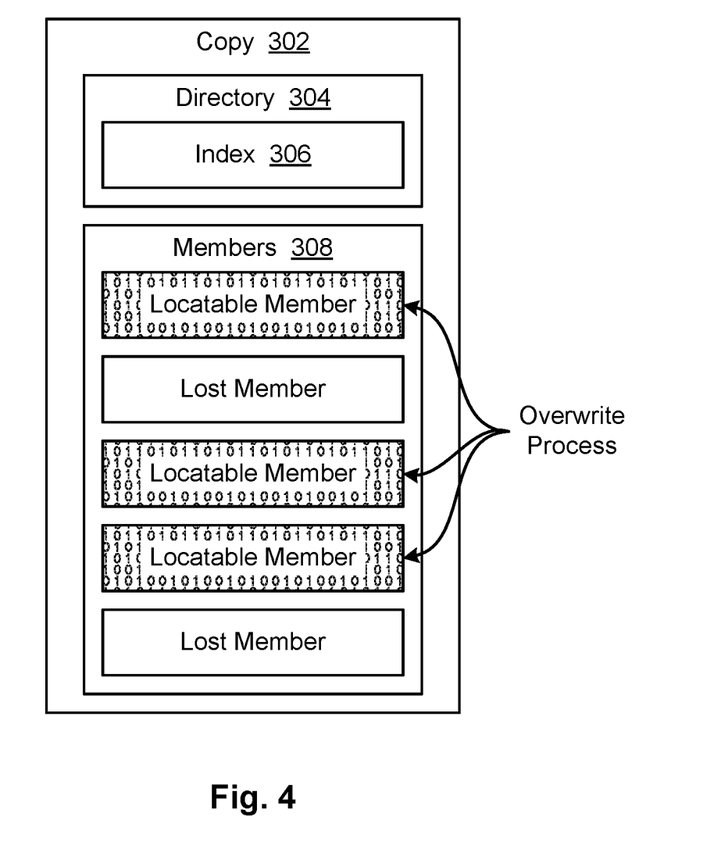
FIG. 4 is a high-level block diagram showing overwriting of the locatable members.

Referring to FIG. 4, once all members 308 that are reachable by the index are located and the data in these members 308 is located, an overwrite process may overwrite the data in the locatable members 308 with random or other unidentifiable data, while leaving the structure of the locatable members 308 and quantify of data within the locatable members 308 in place. The manner in which this may be accomplished will be discussed in more detail in association with FIGS. 7 and 8.

Figure 5:
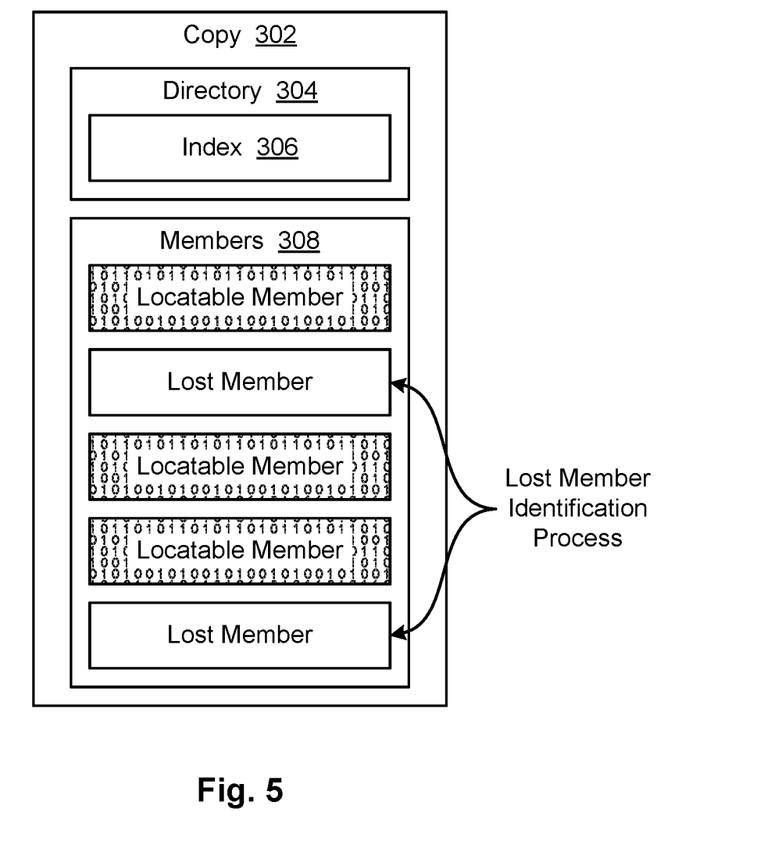
FIG. 5 is a high-level block diagram showing locating of lost members within the data set.
Figure 6:
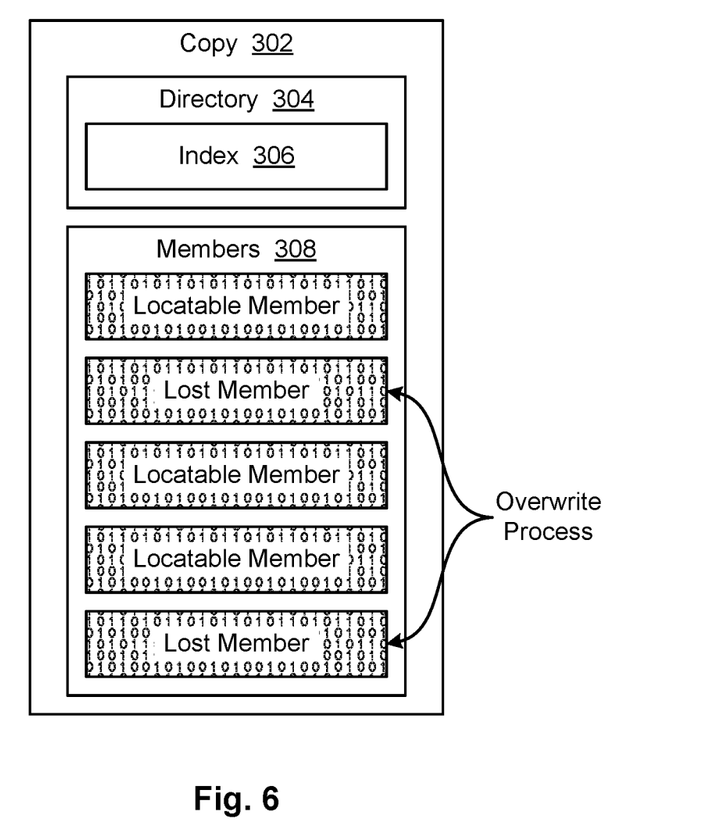
FIG. 6 is a high-level block diagram showing overwriting of the lost members.

Referring to FIGS. 5 and 6, once the locatable members 308 are located and overwritten, a lost-member identification process may locate any members 308 that are not reachable by the index 306. These lost members 308 may then be overwritten with random or other unidentifiable data, as shown in FIG. 6, while leaving the structure of the lost members 308 and quantify of data within the lost members 308 in place. The manner in which this may be accomplished will be discussed in more detail in association with FIGS. 7 and 8. After both the locatable members 308 and lost members 308 are overwritten, the copy 302 of the data set is in ideal form for technicians and/or other external entities to receive the copy 302 for analysis and diagnosis.

Figure 7:
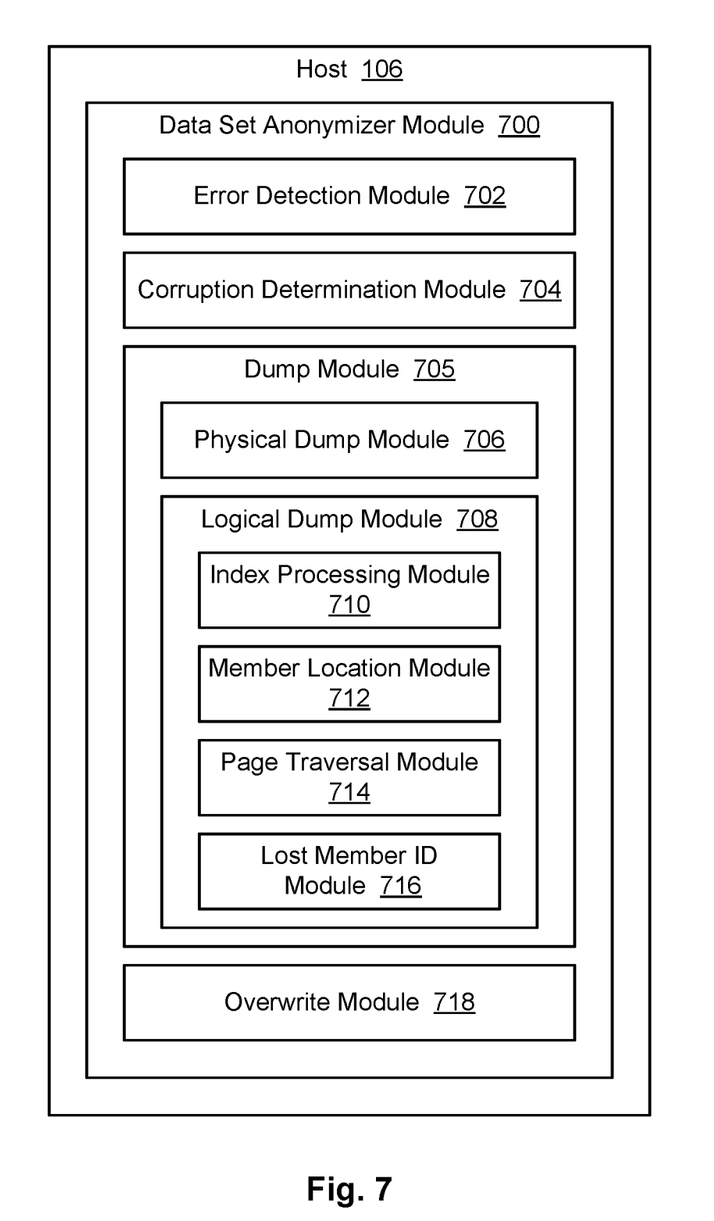
FIG. 7 is a high-level block diagram showing one embodiment of a data set anonymizer module in accordance with the invention.

Referring to FIG. 7, in order to more effectively diagnose and address data corruption in PDSE and other data sets 300, a data set anonymizer module 700 may be provided in a host system 106 (although it is not limited to implementation in a host system 106). The data set anonymizer module 700 may include various sub-modules to provide various features and functions. These sub-modules may include one or more of an error detection module 702, corruption determination module 704, dump module 705, and overwrite module 718. The dump module 705 may include a physical dump module 706 and logical dump module 708. The logical dump module 708 may include one or more of an index processing module 710, member location module 712, page traversal module 714, and lost member identification module 716. The sub-modules are presented by way of example and are not intended to represent an exhaustive list of sub-modules that may be included within the data set anonymizer module 700. The data set anonymizer module 700 may include more or fewer sub-modules than those illustrated, or the functionality of the sub-modules may be organized differently. One embodiment of a method 800 that may be used by the data set anonymizer module 700 to anonymize a data set dump will be discussed in association with FIG. 8.

The error detection module 702 may be configured to detect errors associated with a PDSE data set 300. The corruption determination module 704 may be configured to determine whether the errors are corruption related. Corruption-related errors generally surface as "logical errors," meaning that an unexpected condition has been detected when accessing a PDSE data set 300. Whether the error is corruption-related may depend on the reason code of the logical error and/or the point or time in which the logical error is detected. The error detection module 702 and corruption determination module 704 may ensure that a dump is only taken when it makes sense and when there is a high likelihood that the physical dump will provide useful diagnostic information.

When a corruption-related error is detected, the dump module 705 may initiate a dump of the data set 300. This dump may include both a physical dump and a logical dump. Ideally, the dump will be taken immediately after the error is detected. Taking the dump of the data set 300 immediately after or in close temporal proximity to the initial error may be important as it is possible for partially or minimally corrupted PDSE datasets to continue to be updated and function in a partial manner. When a partially corrupted data set 300 is updated, critical diagnostic information contained therein may be lost.

The initial phase of the dump is to obtain a physical dump of the data set 300. The physical dump module 706 may perform this function. To take the physical dump, the physical dump module 706 reads the PDSE data set 300 from underlying storage media (e.g., hard disk drives 204, solid state drives 204, etc.) as a sequential collection of tracks without regard to the internal structure of the data set, thereby creating an exact copy 302 of the PDSE data set 300. This has the effect of preserving any structural or index corruption in the original PDSE data set 300 for later diagnosis. Due to the homogenous nature of PDSE data sets 300, there is no way to differentiate between index data and member data without actually processing the data set index 306.

The second phase of the dump is to obtain a logical dump of the data set 300. This may be performed by the logical dump module 708. To accomplish this, the index processing module 710 within the logical dump module 708 reads the PDSE's index 306 and processes it to locate the member data within the data set 300. The index processing module 710 may traverse the entire index 306 without regard to any defects that are encountered therein. In other words, the index processing module 710 may attempt to locate all member data that is reachable by the index 306 regardless of whether an error is encountered in the index 306 during its traversal.

The member location module 712 and page traversal module 714 may be tasked with locating member data within the physical dump. In order to locate member data in the physical dump, a relative page number (i.e., page number relative to a beginning of the PDSE data set 300) of a start of the member's linear space needs to be located in the index 306 and used to resolve a starting track number within the physical dump. Because a PDSE data set 300 is typically a homogenous collection of $4k$ pages, the conversion is simple. Once the member location module 712 locates the start of the linear space containing the member data, the page traversal module 714 follows a linked list of pages associated with the member. The overwrite module 718 overwrites these pages with random or other unidentifiable data. During this overwrite process, the members 308 will retain their location and size within the PDSE data set 300, but will be emptied of potentially sensitive/confidential data. This process is repeated for all members 308 that are reachable within the PDSE data set 300.

The final step of the logical dump is for the lost member identification module 716 to identify any pages in the PDSE data set 300 that are lost (i.e., pages that contain data and are within the physical dump but are unreachable by the index 306) since these may also contain sensitive/confidential data. The overwrite module 718 may also overwrite these pages with random or other unidentifiable data.

Figure 8:
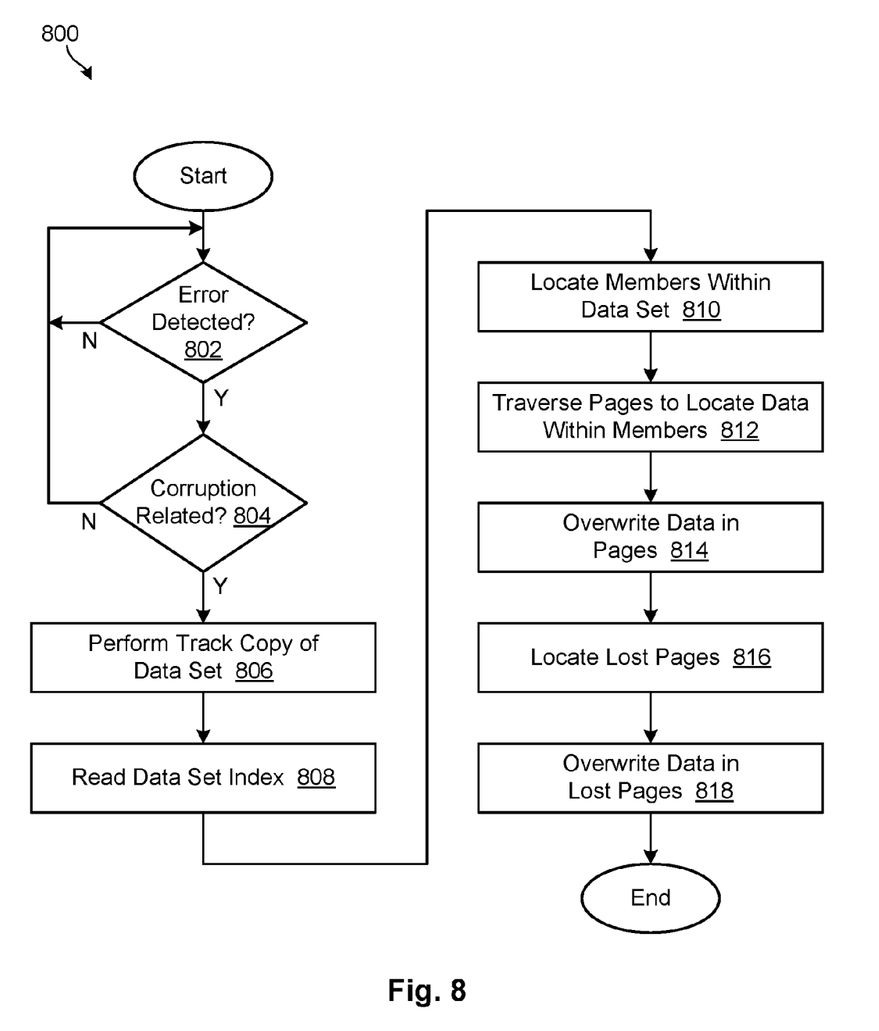
FIG. 8 is a process flow diagram showing one embodiment of a method for anonymizing a data set while retaining the index, structure of the members, and quantity of data within the data set.

Referring to FIG. 8, one embodiment of a method 800 for anonymizing a PDSE data set 300 while retaining the index 306, structure of the members 308, and quantity of data within the data set 300 is illustrated. As shown, the method 800 initially determines 802 whether an error associated the PDSE data set 300 has been detected. If so, the method 800 determines 804 whether the error is corruption related. If so, the method 800 performs 806 a track copy of the data set 300, thereby creating an exact copy 302. The method 800 then reads 808 the data set index 306 of the copy and locates 810 members 308 within the data set 300. The method 800 further traverses 812 the pages of the members 308 and overwrites 814 the data within the pages, while leaving the structure of the members 308 and quantity of data in the members 308 in place. The method 800 then locates 816 any lost pages within the PDSE data set 300 and overwrites 818 the data in the lost pages. At this point, the physical dump of the data set 300 retains the potentially corrupt index 306 in the state that it existed at the time of the initial error, while scrubbing all potentially sensitive/confidential member data from the copy 302. The copy 302 retains the structure of the members 308 and quantity of data therein. At this point the data set 300 is in an ideal form for analysis, either by the owner of the data set 300 or an external technician.

Although particular reference has been made herein to PDSE data sets 108, the systems and methods disclosed herein may be equally applicable or trivially modified to work with other types of data sets. Thus, the systems and methods disclosed herein are not intended to be limited to PDSE data sets 108.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for anonymizing a data set dump, the method comprising:
    detecting an error in an original data set;
    generating a copy of the original data set, the copy comprising an index and a plurality of members;
    reading the index to locate members within the copy that are reachable by the index; and
    converting the copy to a scrubbed copy by overwriting customer data within the members, while retaining the index, structure of the members, and quantity of data within the data set.

2. The method of claim 1, further comprising transmitting the scrubbed copy to a technician for examination.

3. The method of claim 1, further comprising finding lost members within the copy that are not referenced by the index.

4. The method of claim 3, wherein converting the copy to the scrubbed copy comprises overwriting customer data within the lost members.

5. The method of claim 1, wherein the original data set is a Partitioned Data Set Extended (PDSE) data set.

6. The method of claim 1, wherein overwriting the customer data comprises overwriting the customer data with random data.

7. The method of claim 1, wherein overwriting the customer data comprises, for each member, determining a relative page number of a beginning of a member's linear space, and overwriting a linked list of pages from the beginning of the member's linear space.

8. A computer program product for anonymizing a data set dump, the computer program product comprising a computer-readable storage medium having computer-usable program code embodied therein, the computer-usable program code configured to perform the following when executed by at least one processor:
    detect an error in an original data set;
    generate a copy of the original data set, the copy comprising an index and a plurality of members;
    read the index to locate members within the copy that are reachable by the index; and
    convert the copy to a scrubbed copy by overwriting customer data within the members, while retaining the index, structure of the members, and quantity of data within the data set.

9. The computer program product of claim 8, wherein the computer-usable program code is further configured to transmit the scrubbed copy to a technician for examination.

10. The computer program product of claim 8, wherein the computer-usable program code is further configured to find lost members within the copy that are not referenced by the index.

11. The computer program product of claim 10, wherein converting the copy to the scrubbed copy comprises overwriting customer data within the lost members.

12. The computer program product of claim 8, wherein the original data set is a Partitioned Data Set Extended (PDSE) data set.

13. The computer program product of claim 8, wherein overwriting the customer data comprises overwriting the customer data with random data.

14. The computer program product of claim 8, wherein overwriting the customer data comprises, for each member, determining a relative page number of a beginning of a member's linear space, and overwriting a linked list of pages from the beginning of the member's linear space.

15. A system for anonymizing a data set dump, the system comprising:
    at least one processor;
    at least one memory device operably coupled to the at least one processor and storing instructions for execution on the at least one processor, the instructions causing the at least one processor to:
    detect an error in an original data set;
    generate a copy of the original data set, the copy comprising an index and a plurality of members;
    read the index to locate members within the copy that are reachable by the index; and
    convert the copy to a scrubbed copy by overwriting customer data within the members, while retaining the index, structure of the members, and quantity of data within the data set.

16. The system of claim 15, wherein the instructions further cause the at least one processor to transmit the scrubbed copy to a technician for examination.

17. The system of claim 15, wherein the instructions further cause the at least one processor to find lost members within the copy that are not referenced by the index.

18. The system of claim 17, wherein converting the copy to the scrubbed copy comprises overwriting customer data within the lost members.

19. The system of claim 15, wherein the original data set is a Partitioned Data Set Extended (PDSE) data set.

20. The system of claim 15, wherein overwriting the customer data comprises, for each member, determining a relative page number of a beginning of a member's linear space, and overwriting a linked list of pages from the beginning of the member's linear space.

* * * * *